United States Patent
Franke et al.

(10) Patent No.: US 12,082,223 B2
(45) Date of Patent: Sep. 3, 2024

(54) METHODS AND APPARATUSES FOR RESOURCE ALLOCATION IN A TELECOMMUNICATIONS NETWORK

(71) Applicant: Fraunhofer-Gesellschaft zur Förderung der angewandten Forschung e.V., Munich (DE)

(72) Inventors: Norbert Franke, Erlangen (DE); Mohammad Alawieh, Erlangen (DE); Ernst Eberlein, Erlangen (DE); Birendra Ghimire, Erlangen (DE); Niels Hadaschik, Erlangen (DE)

(73) Assignee: Fraunhofer-Gesellschaft Zur Forderung Der Angewandten Forschung E.V. (DE)

( * ) Notice: Subject to any disclaimer, the term of this patent is extended or adjusted under 35 U.S.C. 154(b) by 558 days.

(21) Appl. No.: 17/421,777

(22) PCT Filed: Jan. 9, 2020

(86) PCT No.: PCT/EP2020/050426
§ 371 (c)(1),
(2) Date: Jul. 9, 2021

(87) PCT Pub. No.: WO2020/144278
PCT Pub. Date: Jul. 16, 2020

(65) Prior Publication Data
US 2022/0095296 A1    Mar. 24, 2022

(30) Foreign Application Priority Data
Jan. 10, 2019 (EP) .................... 19151194

(51) Int. Cl.
*H04W 72/51*    (2023.01)
*H04L 5/00*    (2006.01)
*H04W 72/044*    (2023.01)

(52) U.S. Cl.
CPC ........... *H04W 72/51* (2023.01); *H04L 5/0053* (2013.01); *H04W 72/044* (2013.01)

(58) Field of Classification Search
CPC . H04W 64/006; H04W 72/044; H04W 72/51; H04L 5/0053; G01S 5/0236
See application file for complete search history.

(56) References Cited

U.S. PATENT DOCUMENTS

2019/0053071 A1*    2/2019    Ly .................. H04L 5/0025

FOREIGN PATENT DOCUMENTS

| EP | 2373109 A1 | 10/2011 | |
|---|---|---|---|
| EP | 3324694 A1 | 5/2018 | |
| WO | WO-2017190274 A1 * | 11/2017 | ........... H04L 5/0048 |

OTHER PUBLICATIONS

3GPP TSG-RAN WG1 #95, Rat Dependent NR Positioning Solutions, Spokante, United States, Nov. 12-16, 2018, Ericsson.
(Continued)

*Primary Examiner* — Khalid W Shaheed
(74) *Attorney, Agent, or Firm* — Burr & Forman LLP

(57) ABSTRACT

The present disclosure relates methods and apparatuses (UE, scheduler, network node) for resource allocation in a network. According to embodiments herein there are provided a new resource allocation scheme for an UL-TDOA resource allocation scheme and the related UL-PRS signals. The procedure is also applicable for RTT uplink resource allocation. The main technical effects and advantages achieved by the embodiments herein include: A resource allocation concept offering a high flexibility. The positioning update rate is configurable for each UE allowing that for semi static objects a low update rate is selected whereas for moving devices a high update rate is feasible. The signalisation overhead is minimized. The UEs may be configured semi-persistent. Using different transmit periods for each UE results in random SINR (Signal to Interference Noise Ratio)
(Continued)

values and ensures that UEs with high pathloss are also detected. The sequences used for positioning are optimized according to the ToA measurement requirements (unlike the existing SRS).

31 Claims, 10 Drawing Sheets

(56) References Cited

OTHER PUBLICATIONS

Notification of Transmittal of the International Search Report and The Written Opinion of the International Searching Authority, or Declaration, International Searching Authority, Feb. 19, 2020, PCT Application PCT/EP2020/050426.

Technical Report, 3GPP TR 22.872 v16.10, Sep. 2019, Third Generation Partnership Project; Technical Specification Group Services and System Aspects; Study on Positioning Use Cases; Stage 1, (Release 16).

\* cited by examiner

Fig. 6a.

METHODS AND APPARATUSES FOR RESOURCE ALLOCATION IN A TELECOMMUNICATIONS NETWORK

TECHNICAL FIELD

The present disclosure relates to the field of telecommunications and in particular to methods and apparatuses (UE, scheduler, network node) for resource allocation in a network.

BACKGROUND

For Radio Access Technology (RAT) dependent positioning systems generally three methods are distinguished
Round trip delay (RTT) based methods wherein
The distance between radio base station of a gNB and the User Equipment (UE) is estimated by measuring the round-trip time.
The procedure may be performed for several gNBs to allow two-Dimensional (2D) or 3D positioning. Hence the UE is configured to exchange data with several gNBs.
The sequence may typically be performed sequentially. Therefore many messages need to be exchanged.
DL-TDOA (DownLink Time Difference OF Arrival) or Observer TDOA (OTDOA)
A subframe (or parts of a subframe) is reserved for DL-PRS (Downlink Positioning Reference Signal)
The DL-PRS is transmitted from several gNBs at the same time
The UE measures the time difference of arrival
UL(UpLink)-TDOA
The UE transmits a signal
The signal is received by several gNBs in parallel and the ToA (Time of Arrival) is measured by each gNB
Each method has pros and cons. The main advantages of the UL-TDOA are
The update rate of the position may be selected individually for each UE.
For a system using beamforming the number of active beams for reception may be higher than for transmission. Receiving signals from several beams in parallel is feasible. Whereas transmitting signals over several beams generates more interference. Furthermore different time/frequency resources may be required for beams overlapping in space.

LTE (Long Term Evolution) already supports different positioning solutions. As mentioned earlier, the DL-OTDOA concept is based on the DL-PRS (Downlink Positioning Reference Signal). For the UL-TDOA (or U-TDOA) UL-SRS (Sounding Reference Signal) are transmitted by the UE and received by several (synchronized)radio base stations of eNBs in parallel. The eCID (enhanced Cell ID) reuses the timing advance measurements.

LTE U-TDOA operates based on measurements transmitted from a UE and obtained at the base station by a Location Measurement Unit (LMU) TS 36.111 [1]. The LMU is defined as a unit that performs the necessary UTDOA measurements and is not necessarily but could be part of an LTE base station (an eNodeB or eNB may not necessarily be able to obtain measurements allocated from the neighbouring cell (neighboring eNB) which the LMU need to do.

The LMU(s) is(are) configured to know the characteristics of the SRS signal transmitted by the UE for the time period required to calculate uplink measurement. These characteristics may be static over the periodic transmissions of SRS during the uplink measurements. The location server (or LMF) is configured to indicate to the serving eNodeB the need to direct the UE to transmit SRS signals for uplink positioning.

It is up to the eNodeB in UTDOA to make the final decision on resources to be assigned and to communicate this configuration information back to the Enhanced Serving Mobile Location Center (E-SMLC) so that E-SMLC can configure the LMUs. (sec. 8.5 TS-36.305) [2]. The procedure between the Location Server (E-SMLC) and the serving eNodeB for determining the SRS resources is shown in the FIG. 1 which schematically illustrates an uplink information request procedure as disclosed in [2].

The UTDOA in LTE leaves it to the serving eNB to allocate the resources for the uplink resources. With this procedure, a main drawback arises since the positioning resources are not optimally assigned to multiple UEs in the network which could also be connected to multiple eNBs as well. This results then with higher interference ratios, lower reception (uncontrolled) especially for the LMU from neighbouring eNBs.

In NR (New Radio or 5G), uplink sounding reference signals UL SRS reuse has been identified as one of the main limiting factors in Multiple Input Multiple Output (MIMO) systems. This is resulting from the amount of resources dedicated to the transmission of pilot sequences. Currently, cell-edge UEs are assigned a subset of protected pilots, while UEs near the serving base-station or s-gNB or s-eNB share the same pilots across the network [3]. Multiple measurements are required from different base stations for positioning. This requires not only interference management between neighbouring base stations but also coordinated resource allocation to insure radio resources are optimally allocated to avoid self-interference and to provide good reception. For UTDOA or Uplink transmission for RTT in 5G, the resource allocation for uplink positioning has not been addressed till now.

For the DL-OTDOA all eNBs or radio base stations transmit within the same time-slot the DL-PRS signal. The time/time frequency allocation scheme allows the parallel transmission of 6 DL-PRS with no or only minor interference. If more eNBs are active the eNBs are decoupled by using different sequences ("code domain") (Section 7.1.1.1 in TR37.857) [6].

DL-TDOA requires no beamforming (similar to LTE single port PRS transmission) or an advanced beam management for the DL-PRS signals. Compared to this, UL-TDOA offers the following advantages
The activation of many receive beams is possible (this does not generate interference)
If beam forming is used for the UL-PRS signals the higher antenna gain is applicable to the UL-PRS signal reception.
Other advantages of UL-TDOA are
Reduced complexity of the UEs
The amount of data to be processed by the receive part is very small
Typically the transmission of only one OFDM symbol (or parts of it) is already sufficient.
The power consumption may be lower. Compared to RTT methods the amount of data to be transmitted is small
The main drawback of UL-TDOA are the number of RE (Resource Element) occupied if many UEs request localisation.

There is therefore a need for at least one solution that overcomes at least the drawbacks presented above.

SUMMARY

In view of the drawbacks disclosed earlier, there are provided methods and apparatuses involving a new resource allocation scheme for e.g. example UL-TDOA. According to embodiments herein there are provided a new a resource allocation scheme for an UL-TDOA resource allocation scheme and the related UL-PRS signals. The procedure is also applicable for RTT uplink resource allocation.

The main technical effects and advantages achieved by the embodiments herein include:
A resource allocation concept offering a high flexibility.
The positioning update rate is configurable for each UE allowing that for semi static objects a low update rate is selected whereas for moving devices a high update rate is feasible.
The signalisation overhead is minimized. The UEs may be configured semi-persistent.
Using different transmit periods for each UE results in random SINR (Signal to Interference Noise Ratio) values and ensures that UEs with high pathloss are also detected.
The sequences used for positioning may be optimized according to the ToA measurement requirements (unlike the existing SRS).

The embodiments herein relate to a network node or a scheduler or a core network node as described throughout the detailed description and a method therein.

The embodiments herein also relate to a UE as described throughout the detailed description and a method therein.

BRIEF DESCRIPTION OF THE DRAWINGS

The present disclosure will now be described, for exemplary purposes, in more detail by way of embodiment(s) and with reference to the enclosed drawings, in which.

DETAILED DESCRIPTION

Figure 1:
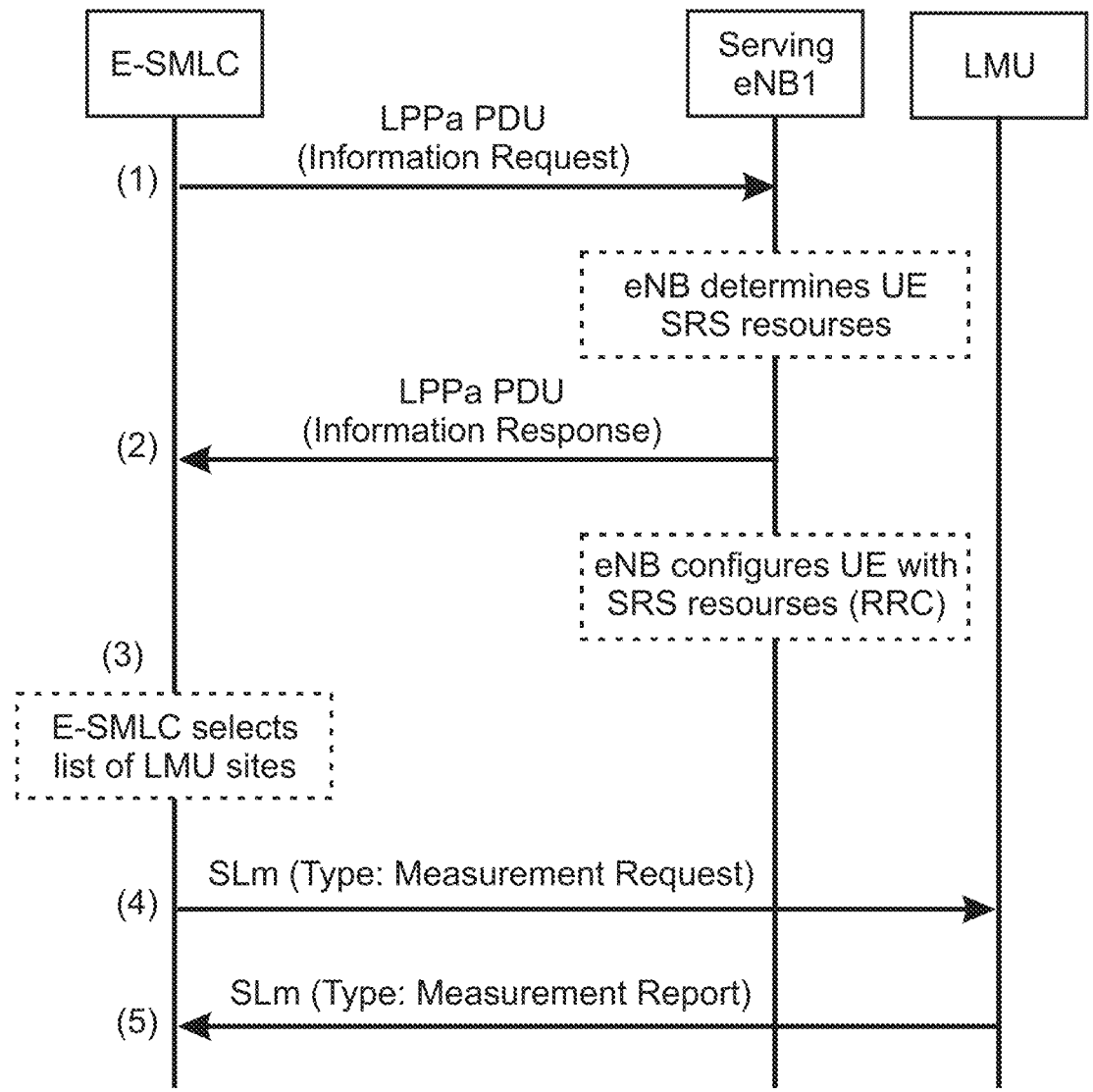
FIG. 1 schematically illustrates an uplink information request procedure according to prior art.

In the following, in several scenarios, a detailed description is presented of the exemplary embodiments in conjunction with the accompanying drawings to enable easier understanding of the solution(s) described herein.

An overview employing the teaching of the embodiments herein will now be described:
The concept is based on the UL-TDOA method.
A set of OFDM symbols is reserved for UL-PRS (uplink position reference signal) transmissions. Typically the set is inserted periodically. The reservation is static or semi-persistent. The periodicity depends on the desired positioning update rate:
For localization of quasi-static mobile phones (pedestrian speed), the rates may be low.
For other agile devices (especially in industrial applications), a higher rate may be preferred.
Many UEs are enabled to use the introduced OFDM symbol resources for transmitting uplink positioning reference signals (UL-PRS).
The set of UEs (scheduled for transmitting UL-PRS) are split into "user groups" (UG). The number of groups depends on the total number of UEs enabled for UL-TDOA and the number of available resources.
For each group a different set of OFDM-subcarriers (or set of resource blocks) is assigned in case of ideal symbol timing the groups are orthogonal in the time/frequency domain.
UEs are assigned to one group are enabled to use the same resource elements, but different codes. The codes are selected according cross correlation properties.
It may happen that the signal strength arrives with high power difference at the g-NB. To avoid static interference situations a UE does not transmit in all time slots assigned to the group. A configurable transmit activity pattern is assigned to each UE. The transmit activity pattern selected for each UE is different. This randomizes the SINR for each link.
One method for different generation of different transmit activity pattern is the assignment of different periodicities $T_{P;n}$. The period assigned to one UE is an integer multiple ("period multiplier") of the period assigned to the OFDM symbols selected for the whole group $T_{gP}$, i.e. $T_{P;n} = m_n \cdot T_{gP}$.
Different period multipliers may be assigned to each UE. Typically the period multiplier $m_n$ is a prime number (or a multiple of a prime number). Different prime numbers are (may be) assigned to different UEs. The allocation of period numbers may/should consider the positioning service level (e.g. UE dynamics/velocity).

The second part of the embodiments herein addresses the resource allocation within an OFDM symbol. The following resource allocations are distinguished
A complete OFDM symbol is assigned to a group
The OFDM symbol are shared by different groups according to the "COMB structure"
Parts of the bandwidth (subbands) are used only.
Within an OFDM symbol more than one subband is assigned to a group.
The subbands assigned to one group are transmitted in different OFDM symbols.

A set of OFDM-subcarrier (or of resource blocks) contiguous in spectrum is a "subband" similar to bandwidth part (BWP) in the language of 3GPP standardization of NR/5G for the same numerology.

Using subbands allows the design of signals with low Peak-to-Average Power Ratio (PAPR) according to the SC-OFDMA concept. In principle SC-FDMA can be also used with the COMB structure, but if the symbols are not aligned and the signal level has a high difference "ACI" (adjacent carrier interference) results.

Figure 2:
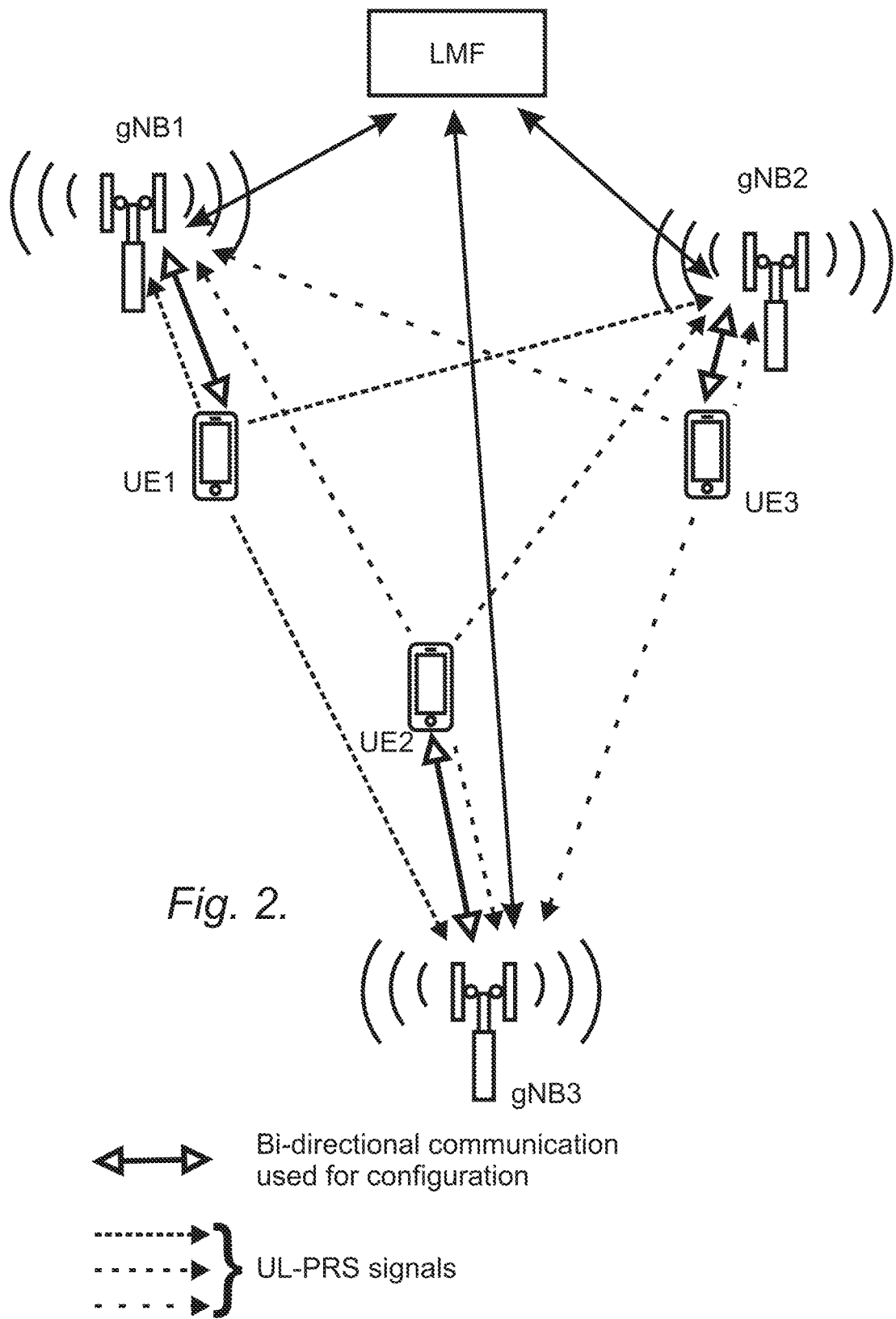
FIG. 2 schematically illustrates a system or a network overview wherein embodiments herein may be applied.

Hence it is proposed according to some embodiments herein:
- Using 2 or more subbands for each UL-PRS signal
  In combination with SC-FDMA the signals may be designed in the time domain and optimized according the time domain properties. Typically for SRS design the frequency response characteristics are important. For the UL-PRS the frequency domain properties are less important.
- Using 2 or more subband provides an additional flexibility. Per subband a different sequence generator can be used Referring to FIG. 2 there is illustrated a system or network overview wherein embodiments herein may be employed. As shown the network includes a LMF, 3 gNBs and 3 UEs. UL PRS signals shown are sent from the UEs and bi-directional communication used for configuration is also depicted.

For UL-TDOA systems two concepts are distinguished
- Asynchronous system
  - The UEs can be transmit only devices
  - The UEs transmit UL-PRS signals randomly or with a pre-configured (fixed) period
  - Only the receive units are synchronized.
- Synchronized/managed UL-TDOA system (further details are described later)
  - The UE is connected to at least one gNB (s-gNB=serving gNB)
  - Through this link the UE is synchronized in frequency and framing to the network.
  - The gNBs are synchronized to a common reference
  - The LMF (Location management function) collects the information from the gNBs and may coordinate the resource allocation.

For a synchronized UL-TDOA system resource elements (RE) may be reserved for the UL-TDOA signals and assigned to a UE. The RE may be one complete OFDM symbol, several OFDM symbols or parts of OFDM symbols.

Figure 3:
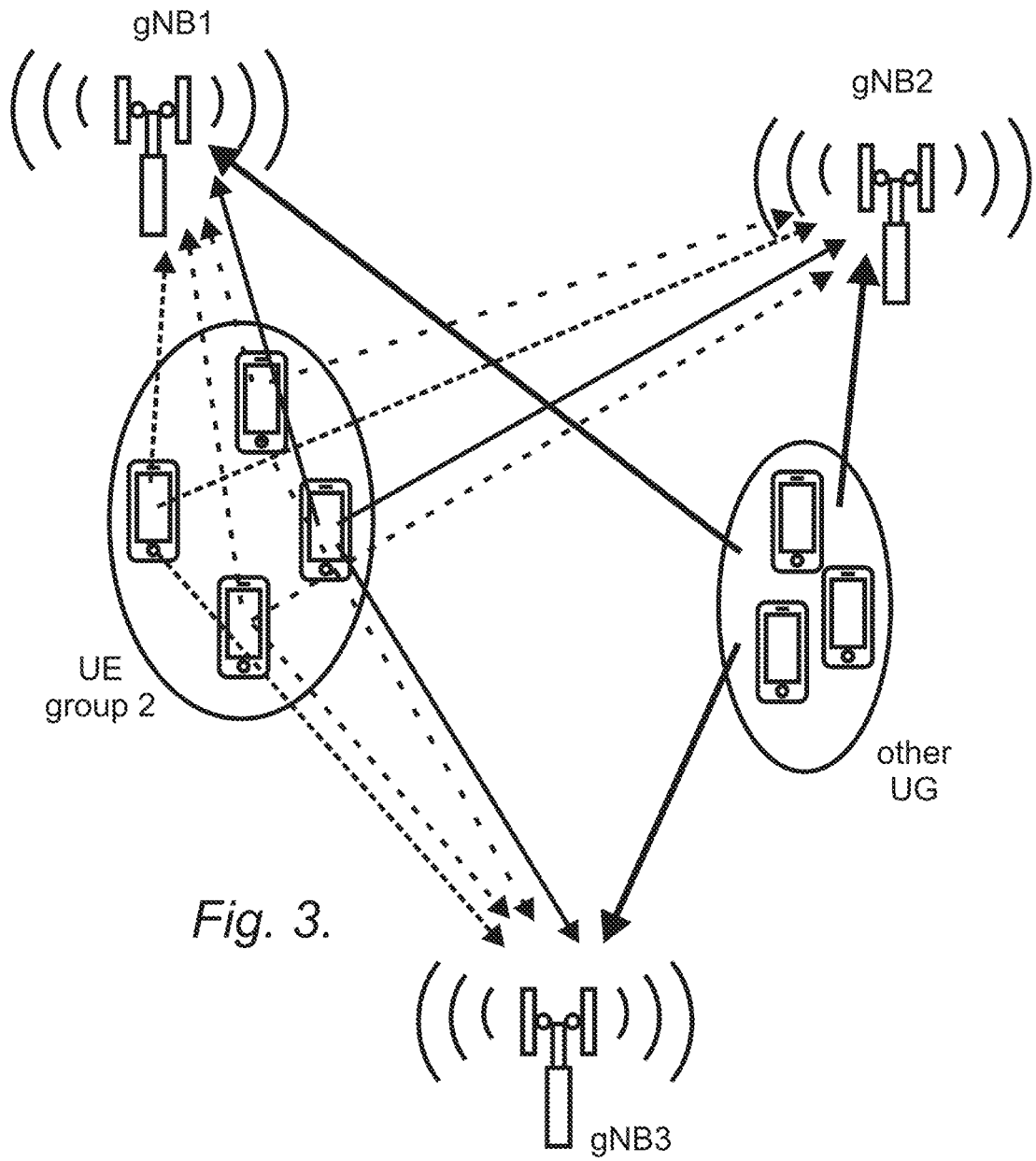
FIG. 3 shows user groups using the same time slots in a network scenario.

Referring to FIG. 3 there is depicted an example of user groups using the same time slots. 2 groups are shown, although the embodiments herein are not restricted to any particular number of groups or UEs or gNBs. UG stands for User Group. Signals of the same user group are shown and signals from "other UG" are also shown.

Within the present embodiments there is provided a method for resource allocation performed by a radio base station or a gNB, the method comprises (performed by the gNB or a RAN node or a Core Network node or a scheduler or any suitable network node):
- assigning the same resource elements (RE) to a group of UEs (UG). The UEs belonging to the UG are configured to transmit in these reserved REs periodically. A different pseudo-noise (PN) sequence may be assigned to each UE of a UG. The PNs should have good cross correlation properties (details see sequence design). The gNBs know the sequence assigned to each UE and the gNB(s) is(are) configured to correlate the received signals with this reference (known sequence assigned) to estimate the ToA (Time of Arrival).

Using correlation techniques the SINR (signal to interference and noise ratio) may be very low. The allowed SINR range depends on the sequence length. Typical values are −15 dB or lower. If the UEs use the same resources, the SINR at the input of the gNB depends on the differences of pathloss. Assuming the UEs are in the same region the pathloss may be similar. However, due to different receive conditions and shadow fading the pathloss difference may exceed the allowed range.

Figure 4:
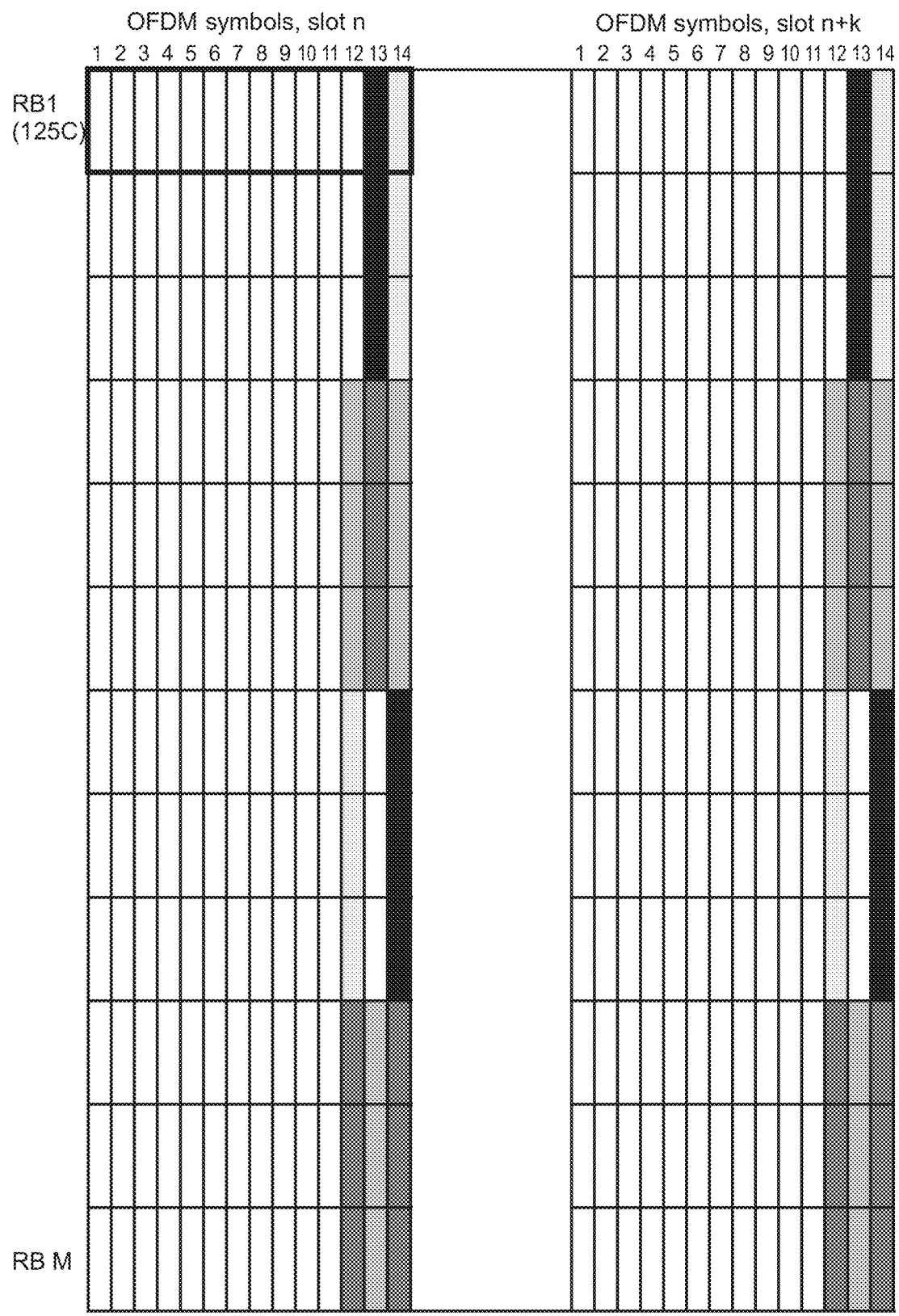
FIG. 4 schematically illustrates a first example of a possible assignment of UL-PRS according to an exemplary embodiment herein. Each colour represents a different UG (User Group).

FIG. 4 depicts a first example of a possible assignment of UL-PRS. Each colour represents a different UG. Assignment of REs to UG is discussed below.

A possible reservation strategy is shown. In a slot a set of OFDM symbols (in the example 3) is allocated to UL-PRS. This reservation is made periodically (e.g. every Kth slot, where K can take any suitable value). The allocated OFDM symbols may be used by one UG or shared by several UG. In this example 3 OFDM symbols are shared by 6 user groups. In the example ¼ of the available SubCarriers (SC) are assigned to one UG. A second OFDM symbol is used to transmit a second block with a different frequency offset (different SubCarrier).

The figure shows a "subband assignment" (parts of the bandwidth are allocated). Alternatively the COMB structure can be used to assign the available SC to a UG.

If UEs belonging to the same group arrive with high level difference at the gNB the separation by the code may not be sufficient and the weaker signal may not be decoded. To avoid that the same UEs interferer in all UL-PRS slots the transmit sequence is randomized. One method may be using different periods for each UE. A UE is configured to transmit only in every $n_\mu$-th UL-PRS slot. If different $n_\mu$ are selected for each UE, different UE interfer in each UL-PRS slot. This randomizes the SINR of the wanted UE.

Figure 5:
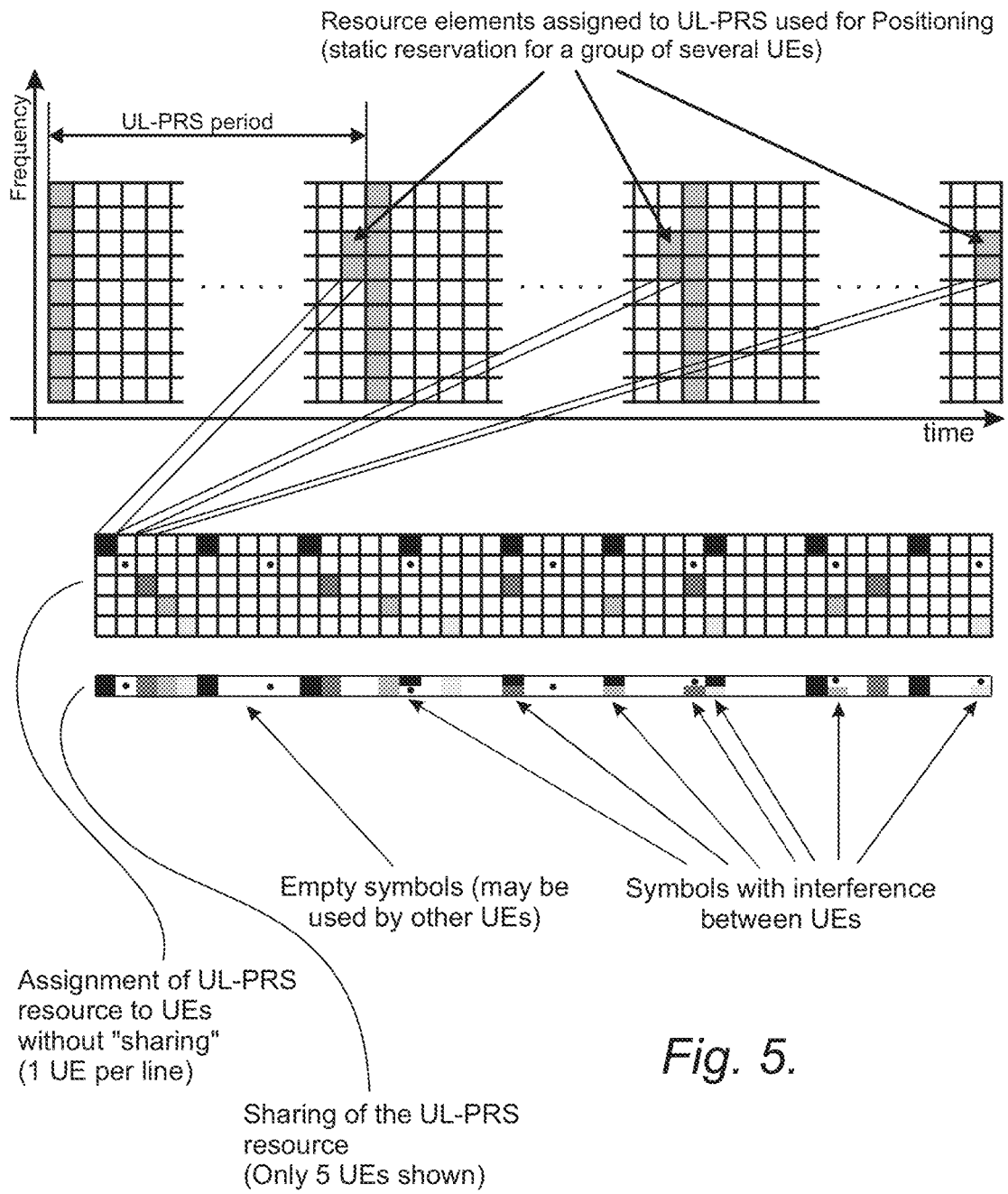
FIG. 5 illustrates an example of assigning different transmit periods to each UE.

An example is given in FIG. 5
The UEs use a different period
  UE1 each $n_{\mu 1}{}^{th}$ frame
  UE2 each $n_{\mu 2}{}^{th}$ frame
  $n_{\mu 1}$, $n_{\mu 2}$ etc. are prime-factors or multiples of prime factors (example: 7,
  8=2*4, 9=3*3, 10=2*5, 11, 13, 17, 19, ... )

Assignment of UL-PRS resource to UEs without sharing is also shown. In this example we consider 1 UE per line as indicated in the middle part of the figure.

Figure 6A:
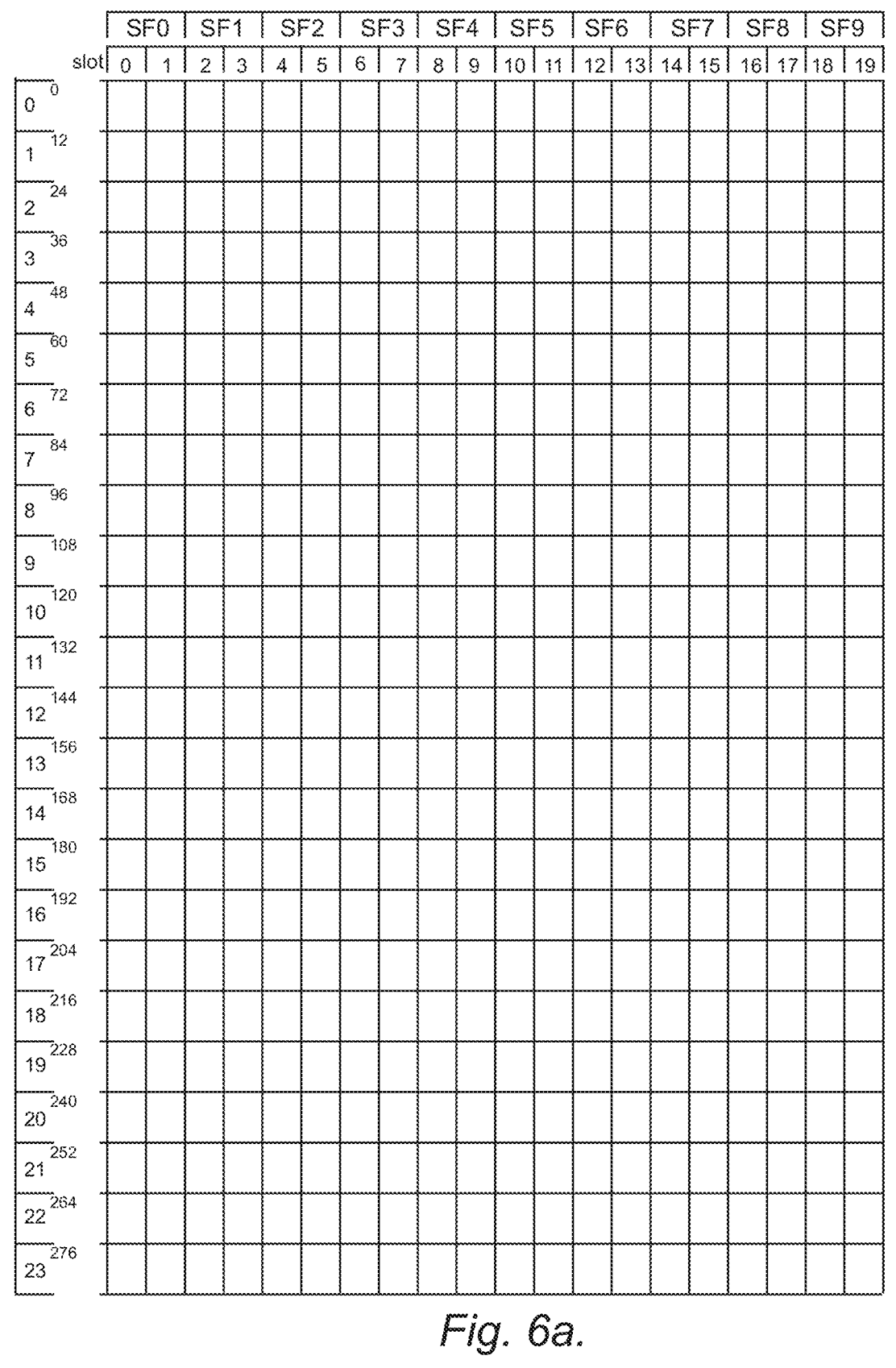
Figure 6B:
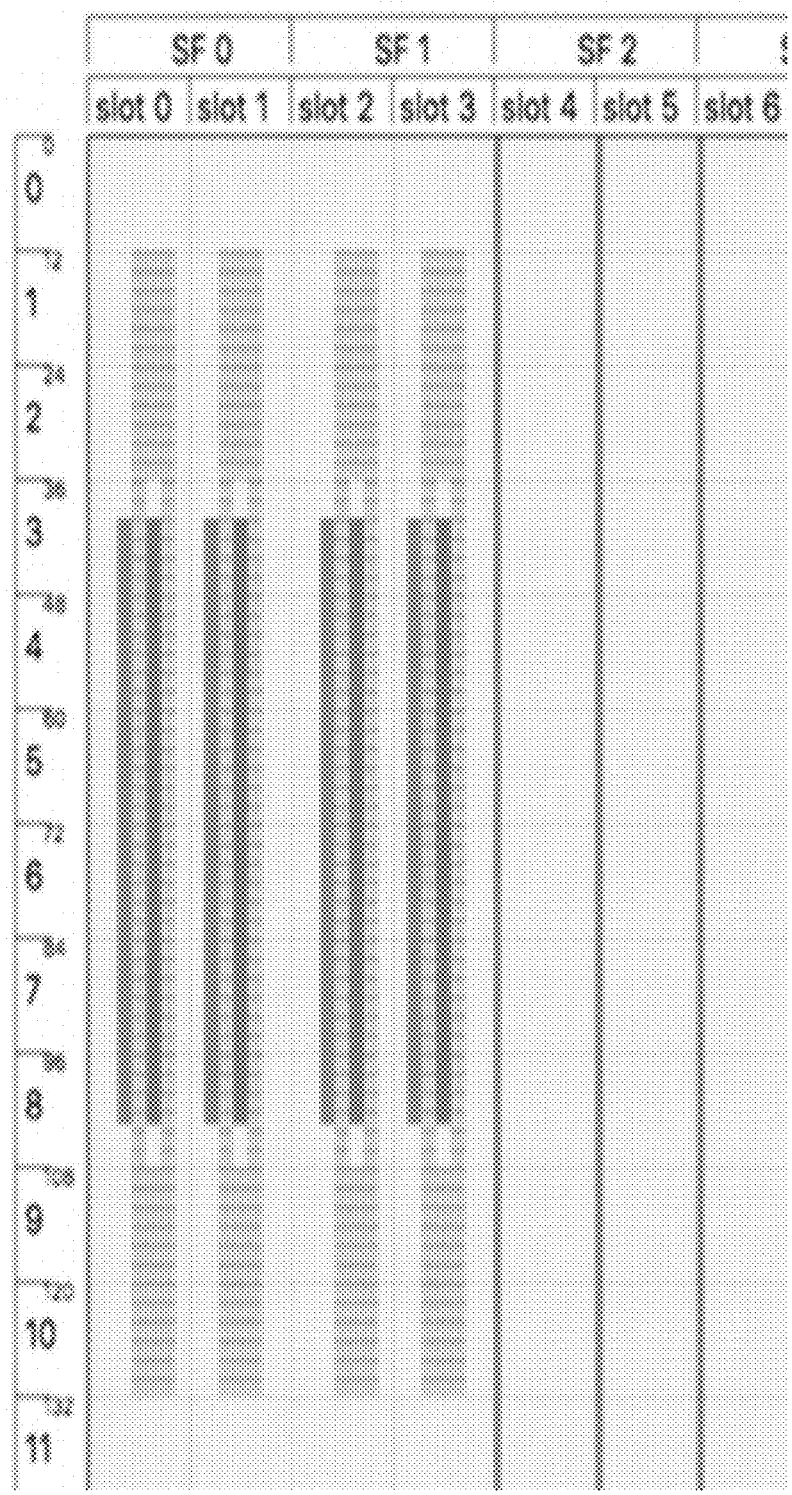
FIG. 6 illustrates a NR frame structure, format 16, 10 MHz bandwidth, 30 kHz carrier spacing.

Referring to FIG. 6 there is illustrated an example of allocation of UL-PRS slots in a NR (New Radio) frame. The shown NR frame structure has format 16, 10 MHz bandwidth, 30 kHz carrier spacing.

For an OFDM symbol assigned to UL-TDOA positioning it is proposed to use normal PUSCH resource blocks (RB). Which OFDM symbols are available for UL signals depends on the format (see TS38.211, Page 12, Table 4.3.2-3). As an example, the structure for TDD format 16 is depicted in FIG. 6. Each frame includes 10 subframes. Only a limited number of resource elements are for purpose. The remaining symbols may be assigned to UL or DL.

Within these frames the resource blocks may be assigned to users. A possible assignment is
  Subframe 0 (SF0) or SF1 are used. The OFDM symbols not assigned to SS-Bursts may be selected.

Figure 7:
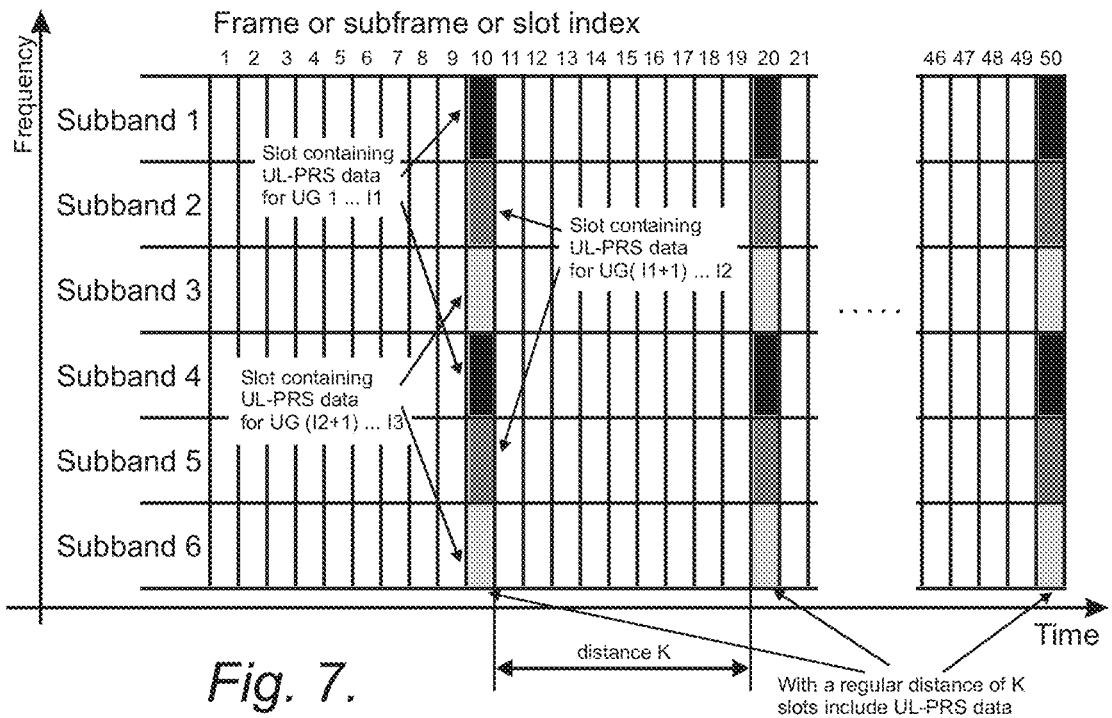
FIG. 7 illustrates an example allocation of slots containing UL-PRS.
Figure 8:
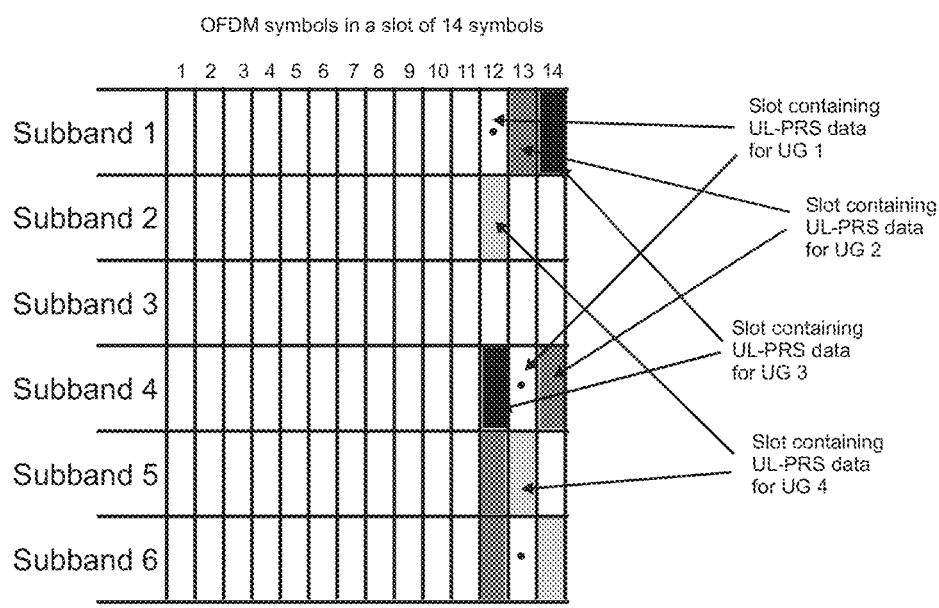
FIG. 8 illustrates an example of sharing of the OFDM symbols between groups.

Example for a possible mapping scheme is described below with reference to FIG. 7 and FIG. 8. Within the sequence of slots every K slots a slot is configured for UL-PRS transmission. Typically only parts of a slot (2 OFDM symbols for example) are assigned to UL-PRS. The other OFDM symbols of the slot may be used for other data.

The OFDM symbols assigned (by the gNB) for UL-PRS are typically shared by several user groups (UG).

User groups (UGs) may be separated by using different frequency resources and/or different time resources. As long the Cyclic Prefix (CP) is not violated the UG may be orthogonally separated in the time/frequency domain thereby avoiding interference.

The allocation may be made "semi-persistently". The distance K may be configured by the RRC (Resource Radio Control) by the gNB. The same allocation may be used for all gNB relevant for the positioning area. The allocation may be coordinated between the gNBs with or without support of the LMF.

Within a time slot the available resources may be shared between other data (other UL and in TDD also DL). Only parts of the available OFDM symbols (typically 14) per slot are used by UL-PRS (in the example 3). The OFDM symbols assigned to UL-PRS are shared between several UG (in the example 9 UGs each group is symbolized by a unique colour). For better time resolution the UL-PRS shall be a wideband signal. This may be achieved by
- Frequency hopping
- COMB structure
- Assignment of 2 or more subbands As shown, for UG1 slot containing UL-PRS data is exemplified. For UG2 slot containing UL-PRS data is exemplified. For UG3 slot containing UL-PRS data is exemplified, and for UG4 slot containing UL-PRS data is exemplified. Hence sharing of the OFDM symbols between 9 groups is depicted.

Using subbands allows:
- Each subband may already contain a PN sequence and may be decoded as narrow-band signal.
- Two subbands may be decoded independently or combined coherently before further processing.
- The architecture may be combined with the SC-FDMA concept. In this case the sequences may be designed in the time domain according to the desired time domain properties. Note: in principle SC-OFDM is also possible for the "COMB structure". However, in case of time-offset resulting from different propagation delays according to the distances or UL signals with different OFDM symbol timing the interference between subcarriers may become relevant.

Figure 9:
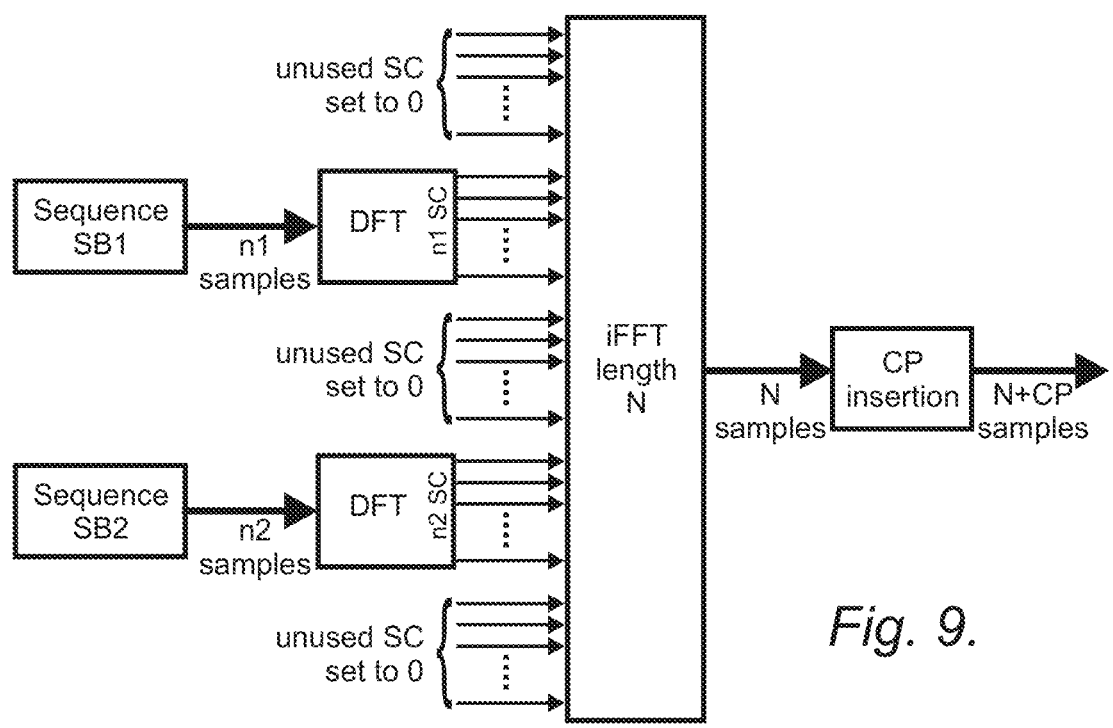
FIG. 9 illustrates an exemplary block diagram of a UE part of subband transmission according to an exemplary embodiment herein.

The principle of the transmit part (UE) of the SC-FDMA signal generation is depicted in FIG. 9. In the example both subbands (SB1 and SB2) are transmitted in one OFDM symbol. The feature that the second subband may be transmitted in another OFDM symbol is not depicted.

FIG. 9 shows:
- An OFDM symbol includes N subcarriers (SCs) N could be equal to 1, 2, 3, . . . N (i.e. a design parameter)
- Many parts of the SC are not used in this example although the embodiments herein are not restricted:
  - Upper band unused SCs
  - Lower band unused SCs
  - Gap in between the SB
- In principle any arbitrary integer multiple of the subcarrier spacing can be used for the subband bandwidth. In FIG. 9, n1 and n2 SC are assigned to the two subbands. n1 and n2 may be of equal value or of different values.
- According to the number of assigned SC(s) a sequence of n1 and n2 samples may be generated every OFDM
- In the same base the bandwidth of the guard bands and the width of the gaps may be set to any arbitrary integer multiple of the SC spacing.
- Example of an implementation according to an embodiment herein may use a more regular structure with n1=n2, SB bandwidth=available SC/K with K=1,2, 3, . . . , gap between the SB is an integer multiple of the SB bandwidth.

Below is discussed a UL-PRS design according to some embodiments herein:

Most of the existing 5G references signals (CSI-RS, SRS, . . . ) are optimized for channel sounding (measurement of the frequency response).

For the proposed scheme according to some embodiments herein the following criteria are relevant
- Good auto correlation properties in the time domain
- Pulse shaping of the correlation peak shall be optimized for high ToA-Estimation accuracy
- Code multiplex: The UL-PRS of different UE assigned to the same group shall have good cross correlation properties
- For efficient use of the uplink power a good PAPR (peak-to-average ratio)

As previously mentioned when describing the system overview on the positioning network (see FIG. 2), The infrastructure includes components such as the LMF and the gNBs. There are several options to realize the UE groups resource allocations, for example:
- Option1: The network gNBs may be controlled by a centralized LMF or a location server over an interface like the NRPPa (NR interface between the gNBs and the LMF).
- Option 2: the gNBs (or LMUs) may communicate directly with each other to coordinate the network resources over the XnAP or Xn interface.

Figure 10:
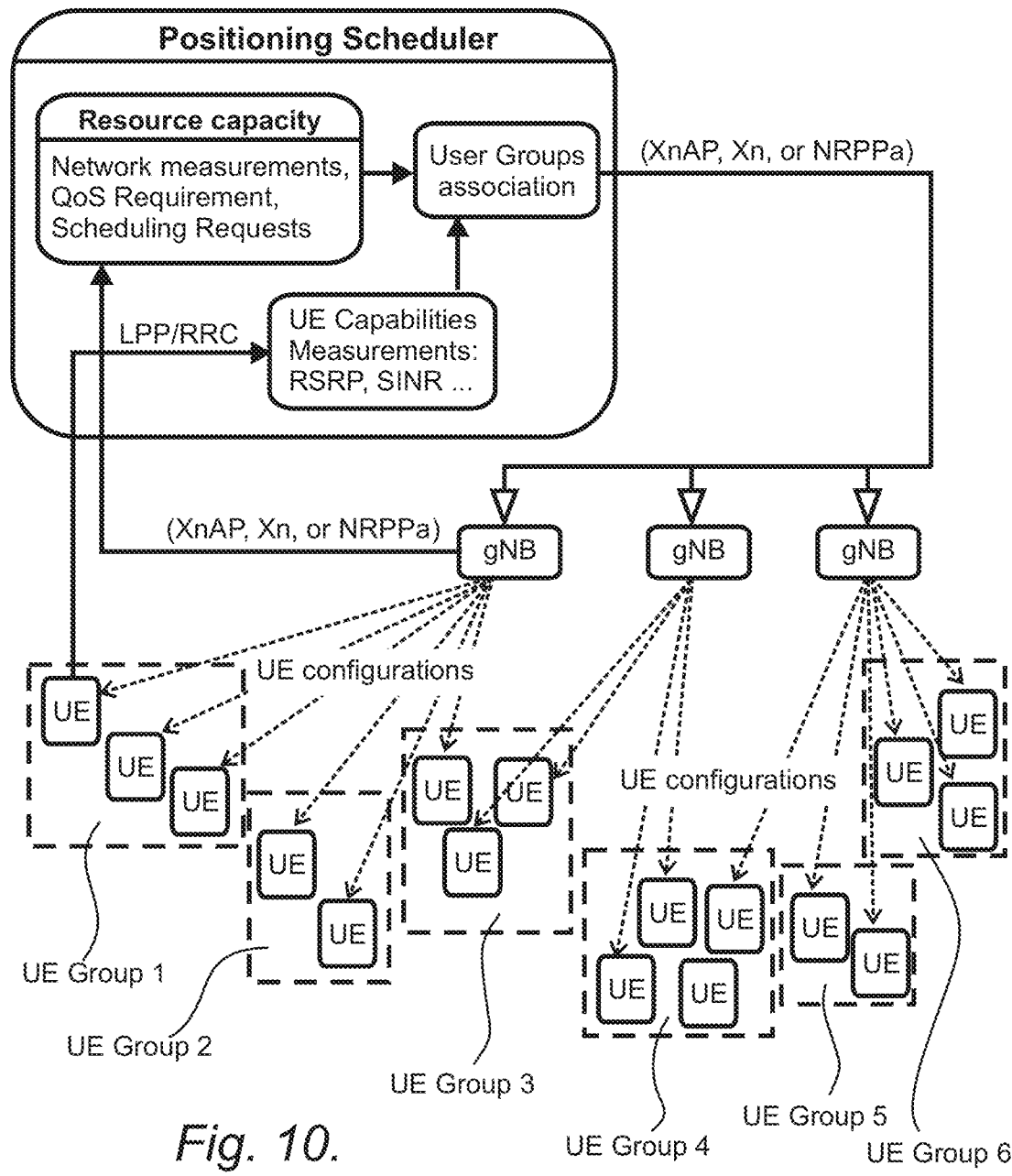
FIG. 10 illustrates and example of UL resources scheduling Dataflow: Positioning Scheduler coordinating or configuring the gNBs over the XnAP or NRPPa (protocol) interface; Scheduler gets input from UE or gNBs to allocate the user groups; gNBs configuring the UE UL resources.

UL Positioning scheduler:

The UE grouping may be transparent from the UE point of view. The network node e.g. gNB) or a core network node is configured to schedule and configure UL resources for PRS for e.g. positioning purposes. This assignment of the UL-PRS configurations for each UE-Group may be performed by a positioning UL scheduler (FIG. 10):
- The scheduler may be a part of the gNB in the RAN (or LMU in RAN or Core Network) or in case of a centralized network the positioning scheduler may be implemented at the central node in the RAN or in the Core network.
- The inputs of the scheduler may be UE measurements like (SINR/RSRP from the serving and neighbouring gNBs, previous positioning measurements reports or required QoS (example: high accuracy or low latency service levels defined in 3GPP SA1). Hence the scheduler may receive UE measurements. The method hence includes receiving UE measurements disclosed above.
- The assignment of user group may be based on UE or on gNBs measurements or the UEs may be simply grouped according to their serving gNB or a different approach. Hence, a RAN node or a Core Network node may be configured to assign user group.
- The scheduler or the RAN node (gNB) or a Core Network node may be configured to request information on the UE capabilities to support for example the subband transmission in FIG. 9.
- Scheduler may be configured to assign the UE group configurations to the gNBs in the network. Hence the method further comprises assigning UE group configurations to the RAN nodes (or gNBs) in the network.
- When it comes to the UE configuration
- Target positioning UE may configure by their serving-gNBs. Hence the method may comprise configuring, by a serving gNB, a (target positioning) UE:
- Basic procedure based on the [7] (TS38.300 Section10.3: Uplink Scheduling) and [4] TS38.331, additionally:
  - If the UL-PRS are transmitted as SRS, then frequency hopping may be used. With the current configuration of SRS, hopping is done from one hopping bandwidth to another in sequence. The periodicity and in which subframes the SRS is transmitted may be configured by the SRS configuration index—which gives the periodicity and offset (w.r.t system frame boundary).

According to an exemplary embodiments, a new grant may be defined by the RAN node or the scheduler or any suitable network node, which may be configured in a semi-persistent manner, or in an aperiodic manner. The configuration rate may be configured according to configuration index, $I_{UPRS}$ which in-turn give the periodicity and offset $N_{UPRS}$ $N_{OFFSET,\ UPRS}$ and these parameters give the periodicity and offset in slots respectively, for example: $(10*n_f - N_{OFFSET,\ UPRS})$ mod $N_{UPRS}$. A user group may be configured with a configuration index to schedule the point when the PRS in UL will be transmitted. Hence the method may comprise configuring a user group with a configuration index to schedule the point when the PRS in UL will be transmitted by at least one UE in said group. Hence the method comprises configuring a user group with a configuration index to schedule the point when the PRS in UL will be transmitted by at least one UE in said group. A user within a group may be given a shift in time domain and frequency domain. The RAN node or the scheduler or Core network node may configure a group with a shift in time domain and frequency domain.

As previously described the exemplary embodiments herein may be performed by a gNB or a positioning scheduler in the network or by a LMF or any suitable RAN node or core network (CN) node.

There are also provided a computer program comprising instructions which when executed on at least one processor of the UE, cause the at least said one processor to carry out the method or procedure previously described.

There are also provided a computer program comprising instructions which when executed on at least one processor of the RAN node or scheduler or Core Network node, cause the at least said one processor to carry out the method or procedure previously described.

There is also provided a UE to perform transmission according to the configuration received or provided by the RAN node or scheduler or Core Network node.

In order to perform the previously described process or method steps related to the UE or gNB or LMF or scheduler, there devices or node each comprise a processor or processing circuit or a processing module or a processor or means; a receiver circuit or receiver module; a transmitter circuit or transmitter module; a memory module a transceiver circuit or transceiver module which may include the transmitter circuit and the receiver circuit. The devices or nodes may further comprises an antenna system which includes antenna circuitry for transmitting and receiving signals to/from in the network topology The UE, gNB or location server, scheduler etc. may belong to any radio access technology including 2G, 3G, 4G or LTE, LTE-A, 5G, WLAN, and WiMax etc.

The processing module/circuit includes a processor, microprocessor, an application specific integrated circuit (ASIC), field programmable gate array (FPGA), or the like, and may be referred to as the "processor." The processor of each device or node (device may be a UE) controls the operation of the nodes and its components. Memory (circuit or module) includes a random access memory (RAM), a read only memory (ROM), and/or another type of memory to store data and instructions that may be used by processor. In general, it will be understood that the UE, gNB or server or scheduler in one or more embodiments includes fixed or programmed circuitry that is configured to carry out the operations in any of the embodiments disclosed herein.

In at least one such example, each device or node includes a microprocessor, microcontroller, DSP, ASIC, FPGA, or other processing circuitry that is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out the operations disclosed herein including anyone of method steps already described including the pending claims. Further, it will be appreciated that the each node or each device may comprise additional components.

The main technical effects and advantages achieved by the embodiments herein include:

A resource allocation concept offering a high flexibility. The positioning update rate is configurable for each UE allowing that for semi static objects a low update rate is selected whereas for moving devices a high update rate is feasible.

The signalisation overhead is minimized. The UEs may be configured semi-persistent.

Using different transmit periods for each UE results in random SINR (Signal to Interference Noise Ratio) values and ensures that UEs with high pathloss are also detected.

The sequences used for positioning are optimized according to the ToA measurement requirements (unlike the existing SRS).

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. The embodiments herein may be applied in any wireless systems including GSM, 3G or WCDMA, LTE or 4G, LTE-A (or LTE-Advanced), 5G, WiMAX, WiFi, satellite communications, TV broadcasting etc.

REFERENCES

[1] 3GPP TS 36.111 "Location Measurement Unit (LMU) performance specification; Network based positioning systems in Evolved Universal Terrestrial Radio Access Network (E-UTRAN)" (Release 11) V 11.0.0

[2] 3GPP TS 36.305 "Stage 2 functional specification of User Equipment (UE) positioning in E-UTRAN" (Release 15) V15.1.0 (2018-09)

[3] Giordano, Lorenzo Galati, et al. "Uplink sounding reference signal coordination to combat pilot contamination in 5G massive MIMO." Wireless Communications and Networking Conference (WCNC), 2018 IEEE. IEEE, 2018.

[4] 3GPP TS 38.331 "Radio Resource Control (RRC); Protocol specification" (Release 15) V15.3.0 (2018-09)

[5] Erik Dahlman et.all, "5G NR The next generation wireless access technology"

[6] 3GPP TR 37.875 "Study on indoor positioning enhancements for UTRA and LTE" (Release 13) V13.1.0 (2016-01)

[7] 3GPP TS 38.300 "NR; NR and NG-RAN Overall Description, Stage 2" V15.3.1 (2018-10)

The invention claimed is:

1. A method, performed by a network node, for resource allocation, said resource allocation being used for UpLink-Time Difference Of Arrival (UL-TDOA), and for UpLink- Positioning Reference Signal (UL-PRS) signal transmission, the resource allocation being semi-persistent or aperiodic, the method comprising:

assigning the same resource elements (REs) to a group of User Equipments (UEs) for enabling said UEs belonging to said group to transmit in said resource elements;

configuring a periodic or semi-persistent assignment with a first periodicity such as a UL-PRS period, of REs to said group;

assigning for each UE of said group a sequence, wherein the assigned sequences are different for each UE; and configuring, for each UE, an activity pattern defining a periodicity assigned to the group in which the UE transmits, wherein the activity pattern for each UE is different.

2. The method according to claim 1 wherein, for each UE, the configured activity pattern or related group is configured according to the UE state, wherein the state includes: not moving or moving.

3. The method according to claim 1 wherein the activity pattern of a UE is defined by a prime number or a multiple of the prime number, defining a periodic activity pattern, and different prime numbers are assigned to different UEs.

4. The method according to claim 1, further comprising, configuring a UE, belonging to said group, to transmit only in every nu-th of an UL-PRS slot, and selecting different nu for each UE, wherein nu is a prime factor or a multiple of prime factors.

5. The method according to claim 1 wherein several groups share a same set of OFDM symbols and the UEs belonging to different groups use different time/frequency resource elements or different subsets of the reserved resource elements.

6. The method according to claim 5 wherein the time/frequency resource allocation includes time only, frequency only, frequency hopping, or COMB structure.

7. A network node for resource allocation, said resource allocation being used for UpLink-Time Difference Of Arrival (UL-TDOA), and for UpLink-Positioning Reference Signal (UL-PRS) signal transmission, the resource allocation being semi-persistent or aperiodic, the network node comprising a processor and a memory, said memory containing instructions executable by said processor whereby said network node is operative to:

assign the same resource elements (REs) to a group of User Equipments (UEs) for enabling said UEs belonging to said group to transmit in said resource elements;

configure a periodic or semi-persistent assignment with a first periodicity such as a UL-PRS period, of REs to said group;

assign for each UE of said group a sequence, wherein the assigned sequences are different for each UE; and configure, for each UE, an activity pattern defining a periodicity assigned to the group in which the UE transmits, wherein the activity pattern for each UE is different.

8. A User Equipment (UE) belonging to a group of UEs, which are assigned the same resource elements (REs); the group of UEs being configured with a configuration index to schedule a point when a Positioning Reference Signal (PRS) in UpLink (UL) will be transmitted; the UE being configured to transmit in said assigned resource elements, and the UE being assigned a sequence, wherein the sequences assigned to each UE of the group are different; and wherein the UE is configured to transmit in REs assigned to the group, wherein the UE is configured to transmit in a subset of the assigned REs according to an activity pattern, and wherein the activity pattern is different from the activity pattern configured to the other UEs of the group.

9. The UE according to claim 8 wherein the configured transmit period is configured according to the UE state, wherein the state includes: not moving or moving at pedestrian speed or moving with vehicle speed.

10. The UE according to claim 8 wherein the activity pattern of the UE is defined by a prime number or a multiple of the prime number, defining a periodic activity, which prime number is different from prime numbers assigned to other UEs.

11. The UE according to 8, further configured to transmit only in every nu-th of an UpLink-Positioning Reference Signal, UL-PRS slot, and wherein nu is selected different for each UE, wherein nu is a prime factor or a multiple of prime factors.

12. The method according to claim 1, wherein different subbands (SBs) are allocated to different groups.

13. The method according to claim 12, wherein, in combination with SC-FDMA, the signals are designed in the time domain and optimized according the time domain properties.

14. The method according to claim 12, wherein a different sequence generator is used for each subband.

15. The method according to claim 12, wherein each subband contains a PN sequence and is decoded as a narrow-band signal.

16. The method according to claim 12, wherein the two subbands are decoded independently or combined coherently before further processing.

17. The method according to claim 12, wherein both subbands (SB1, SB2) are transmitted in one OFDM symbol, or wherein the second subband is transmitted in another OFDM symbol than the first subband.

18. The method according to claim 17, wherein the OFDM symbol includes N subcarriers (SCs), where N is equal to 1, 2, 3, . . . N, wherein the N SCs are split into subbands and each subband uses less than N SCs.

19. The method according to claim 18, wherein parts of the SC are not used by a first UE, but are used by other UEs, such as upper band unused SCs, lower band unused SCs and a gap in between the subband.

20. The method according to claim 18, wherein any arbitrary integer multiple of the SC spacing is used for the subband bandwidth, such as that n1 and n2 SC are assigned to the two subbands, where n1 and n2 are of equal value or are of different values.

21. The method according to claim 18, wherein a sequence of n1 and n2 samples are generated for every OFDM symbol in the frequency domain according to the number of assigned SC(s).

22. The method according to claim 19, wherein bandwidth of guard bands and width of the gaps are set to any arbitrary integer multiple of the SC spacing in the same base.

23. The method according to claim 19, wherein a regular structure is used with n1=n2, and SB bandwidth=available SC/K, with K=1,2,3, . . . , and the gap between the SB is an integer multiple of the SB bandwidth.

24. A method for resource allocation performed by a network node, the method comprising:

scheduling and configuring UpLink (UL) resources for Positioning Reference Signals (PRS) for one or more user equipments (UEs); and configuring a user group of the one or more UEs with a configuration index to schedule a point when the PRS in the UL will be transmitted, wherein:

the configuring made by the network node is based on parameters received from a positioning scheduler at a location server or location management function (LMF);

the parameters sent from the positioning scheduler are based on input parameters to the positioning scheduler received from radio base station (gNBs) and UEs, and the input parameters to the positioning scheduler are UE measurements, or measurements from the serving and neighboring gNBs, like Signal to Interference Noise Ratio (SINR) or Reference Signal Receive Power (RSRP), previous positioning measurements reports or required Quality of Service (QOS).

25. The method according to claim 24, wherein the positioning scheduler is a part of a gNB in a Radio Access Network (RAN), or Location Measurement Unit (LMU) in RAN or Core Network, or in case of a centralized network the positioning scheduler is implemented at a central node in the RAN or in the Core Network.

26. The method according to claim 25, wherein a UE is assigned to user group by the positioning scheduler based on UE or on gNBs measurements, or based on their serving gNB.

27. The method according to claim 25, wherein the positioning scheduler or the RAN node (gNB) or a Core Network node is configured to request information on the UE capabilities, for example to support subband transmission.

28. The method according to claim 24, wherein the positioning scheduler is configured to assign the UE group configurations to the gNBs in the network.

29. The method according to claim 24, wherein a target positioning UE is configured by their serving-gNBs.

30. The method according to claim 24, wherein a new grant is defined by a RAN node or the positioning scheduler or any suitable network node, which may be configured in a semi-persistent manner, or in an aperiodic manner.

31. The method according to claim 24, wherein the network node is a s-gNB or a core network node.

* * * * *